US012792723B2

(12) United States Patent
Perera et al.

(10) Patent No.: US 12,792,723 B2
(45) Date of Patent: Nov. 10, 2026

(54) MIMICRY-BASED ATTACK GENERATION

(71) Applicant: Oracle International Corporation, Redwood Shores, CA (US)

(72) Inventors: Balasuriyage Anjana Visula Perera, Adelaide (AU); Francois Gauthier, Brisbane (AU); Kostyantyn Vorobyov, Adelaide (AU)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 18/737,760

(22) Filed: Jun. 7, 2024

(65) Prior Publication Data

US 2025/0378156 A1 Dec. 11, 2025

(51) Int. Cl.
*G06F 21/52* (2013.01)

(52) U.S. Cl.
CPC ........ *G06F 21/52* (2013.01); *G06F 2221/033* (2013.01)

(58) Field of Classification Search
CPC ........................................................ G06F 21/52
USPC ............................................................ 726/23
See application file for complete search history.

(56) References Cited

U.S. PATENT DOCUMENTS 8,769,684 B2 * 7/2014 Stolfo .................... G06F 21/55 709/224
11,824,894 B2 * 11/2023 Simioni .............. H04L 63/1425
2009/0150374 A1 * 6/2009 Dewey .................. G06F 21/562 707/999.005
2012/0117644 A1 * 5/2012 Soeder .................. G06F 21/554 726/22
2013/0254895 A1 * 9/2013 Neil ....................... G06N 5/045 726/25
2014/0317741 A1 * 10/2014 Be'ery .................... H04L 63/16 726/23
2016/0044057 A1 * 2/2016 Chenette ................ H04L 63/20 726/1
2020/0404007 A1 * 12/2020 Singh ................ G06F 16/24537
2021/0185087 A1 * 6/2021 Wu ......................... H04L 43/08
(Continued)

FOREIGN PATENT DOCUMENTS

CN 117371041 A * 1/2024 ......... G06F 21/6227

OTHER PUBLICATIONS

David Wagner; Mimicry Attacks on Host-Based Intrusion Detection Systems: ACM: 2002, pp. 255-264.*

*Primary Examiner* — Monjur Rahim
(74) *Attorney, Agent, or Firm* — Lathrop GPM LLP

(57) ABSTRACT

A method implements mimicry-based attack generation. The method may include applying an exploration model to a first query of a set of benign queries to generate an exploration query and applying an injection prevention model to the exploration query to generate an exploration result. The method may further include updating the set of benign queries to include the exploration query when the exploration result indicates the exploration query was accepted and applying an exploitation model to a second query of the set of benign queries to generate an exploitation query comprising a protected data identifier. The method may include applying the injection prevention model to the exploitation query to generate an exploitation result and storing the exploitation query as an exfiltration query when the exploitation result comprises protected data accessed with the protected data identifier.

20 Claims, 6 Drawing Sheets

(56) References Cited

U.S. PATENT DOCUMENTS

| | | | | |
|---|---|---|---|---|
| 2023/0009127 | A1* | 1/2023 | Boyer | H04L 41/16 |
| 2023/0185899 | A1* | 6/2023 | Bendanan | G06F 21/6227 726/23 |
| 2023/0344838 | A1* | 10/2023 | Rao | H04L 63/1416 |
| 2024/0022577 | A1* | 1/2024 | Fu | H04L 63/1425 |
| 2024/0031401 | A1* | 1/2024 | Haddadpajouh | H04L 63/145 |
| 2024/0098100 | A1* | 3/2024 | Lal | H04L 63/1491 |
| 2024/0111868 | A1* | 4/2024 | da Silva | G06F 21/566 |
| 2024/0406210 | A1* | 12/2024 | Sellars | G06F 9/45558 |
| 2025/0165616 | A1* | 5/2025 | Cameron | G06F 21/552 |
| 2025/0240313 | A1* | 7/2025 | Zhang | H04L 41/16 |
| 2025/0373641 | A1* | 12/2025 | Yadav | H04L 63/1433 |

* cited by examiner

MIMICRY-BASED ATTACK GENERATION

BACKGROUND

Database-backed applications are targets for malicious actors. Query language injection (e.g., scripted query language (SQL) injection (SQLi)) is a technique that attackers may use to launch data exfiltration attacks against vulnerable applications. With the potential for attack, applications should have adequate defenses in place against query injections to protect the security and confidentiality of data.

To provide protection for database-backed applications against query injection attacks, runtime application self-protection approaches may be used that detect and prevent the execution of malicious queries at runtime. These approaches, referred to as runtime query injection prevention approaches, may perform better at defending against query injection attacks than other approaches, such as web application firewalls (WAFs). Runtime query injection prevention approaches may use components referred to as injection prevention models that analyze the benign queries of an application (referred to as training queries) and use the training queries to define the benign uses of the application. Incoming queries are compared to the known benign queries to determine if the incoming queries are benign or malicious.

Different types of runtime query injection prevention approaches may include syntax-based approaches and feature-based approaches. Injection prevention models that utilize a syntax-based approaches may flag a query as an attack if the syntax structure of the query is modified by the user-input or is different from the syntax structures of known benign queries. Injection prevention models that use a feature-based approach may capture database access features of known benign queries (such as the tables, logical operators, functions, and comparisons used in the benign queries) and flag an incoming query as an attack if the incoming query has features that are not within the features from the benign queries.

Runtime query injection prevention approaches may miss data exfiltration attacks that resemble the benign queries used to train an injection prevention model. For example, an attacker may disguise a data exfiltration attack that leaks information from a column containing sensitive data by modifying a column name in a benign query without altering the syntax structure or introducing additional database access features. Such an attack uses 'mimicry' to evade the defenses that may be provided by injection prevention models. In other words, the attack query mimics a benign query in terms of syntax or features accessed. A challenge is to test injection prevention models against such attacks before deploying the injection prevention models to protect database-backed applications.

SUMMARY

In general, in one or more aspects, the disclosure relates to a method implementing mimicry-based attack generation. The method may include applying an exploration model to a first query of a set of benign queries to generate an exploration query and applying an injection prevention model to the exploration query to generate an exploration result. The method may further include updating the set of benign queries to include the exploration query when the exploration result indicates the exploration query was accepted and applying an exploitation model to a second query of the set of benign queries to generate an exploitation query comprising a protected data identifier. The method may include applying the injection prevention model to the exploitation query to generate an exploitation result and storing the exploitation query as an exfiltration query when the exploitation result comprises protected data accessed with the protected data identifier.

In general, in one or more aspects, the disclosure relates to a system that may include at least one processor and an application that, when executing on the at least one processor, implements mimicry-based attack generation. Execution of the application may perform applying an exploration model to a first query of a set of benign queries to generate an exploration query and applying an injection prevention model to the exploration query to generate an exploration result. Execution of the application may further perform updating the set of benign queries to include the exploration query when the exploration result indicates the exploration query was accepted and applying an exploitation model to a second query of the set of benign queries to generate an exploitation query comprising a protected data identifier. Execution of the application may further perform applying the injection prevention model to the exploitation query to generate an exploitation result and storing the exploitation query as an exfiltration query when the exploitation result comprises protected data accessed with the protected data identifier.

In general, in one or more aspects, the disclosure relates to a non-transitory computer readable medium that includes instructions executable by at least one processor to implement mimicry-based attack generation. Execution of the instructions may perform applying an exploration model to a first query of a set of benign queries to generate an exploration query and applying an injection prevention model to the exploration query to generate an exploration result. Execution of the instructions may further perform updating the set of benign queries to include the exploration query when the exploration result indicates the exploration query was accepted and applying an exploitation model to a second query of the set of benign queries to generate an exploitation query comprising a protected data identifier. Execution of the instructions may further perform applying the injection prevention model to the exploitation query to generate an exploitation result and storing the exploitation query as an exfiltration query when the exploitation result comprises protected data accessed with the protected data identifier.

Other aspects of one or more embodiments may be apparent from the following description and the appended claims.

BRIEF DESCRIPTION OF DRAWINGS

Similar elements in the various figures are denoted by similar names and reference numerals. The features and elements described in one figure may extend to similarly named features and elements in different figures.

DETAILED DESCRIPTION

Figure 1:
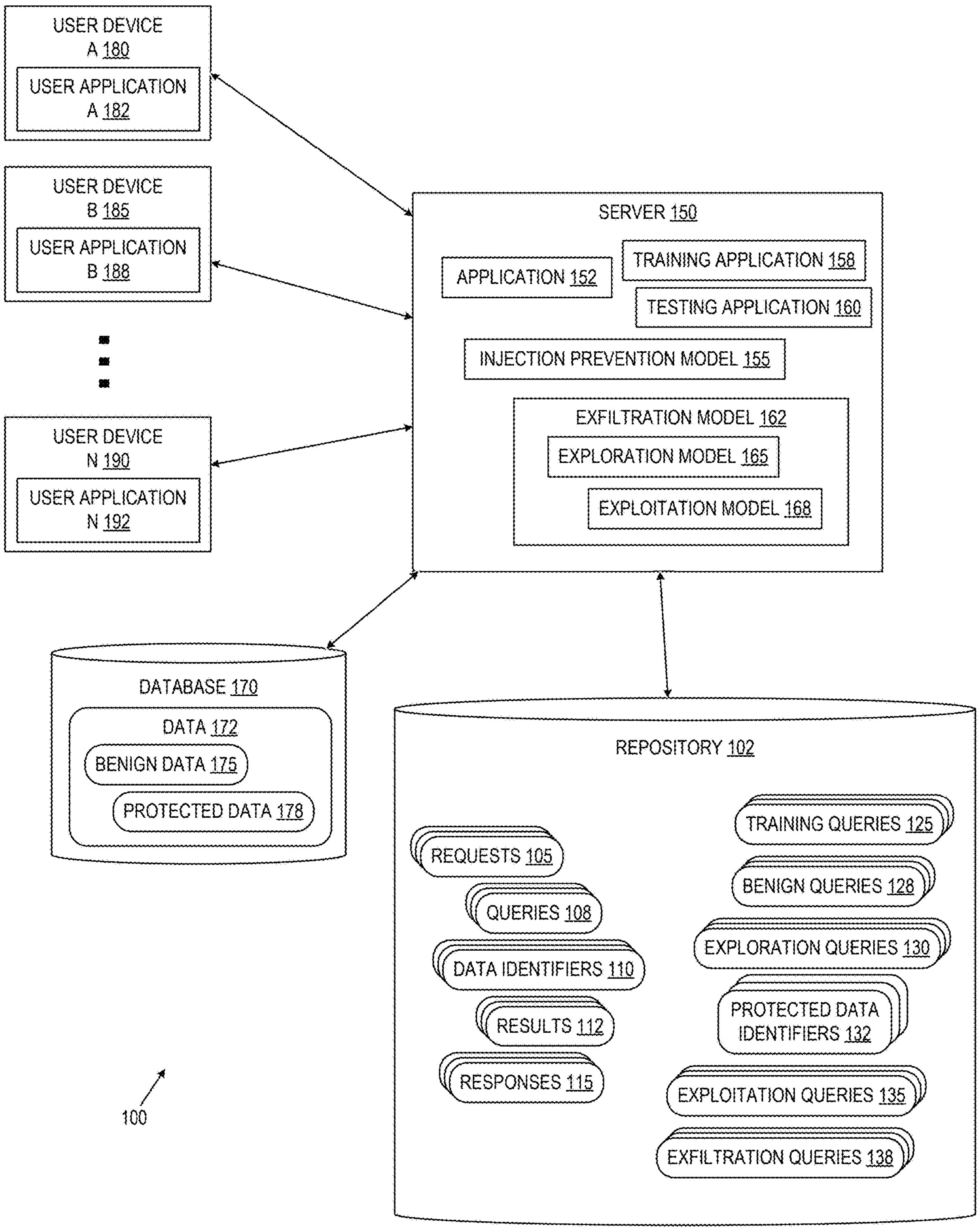
FIG. 1 shows a diagram in accordance with one or more embodiments of the disclosure.

Embodiments of the disclosure perform mimicry-based attack generation, which may be used to test injection prevention models. Mimicry is used to generate exfiltration queries that mimic benign queries to a database in a multi-staged method. In an exploration stage, a benign query is selected that may be one of the queries used to train the injection prevention model. An exploration model is applied to the benign query to mutate the benign query into an exploration query. The injection prevention model is applied to the exploration query to determine if the injection prevention model will deny processing of the exploration query. If not denied, the exploration query may be added into the list of benign queries for further exploration or exploitation. In an exploitation stage, a second benign query may be selected. The second benign query may be the same as the benign query selected in the exploration stage, may be the exploration query generated in the exploration stage, may be another benign query from the set of benign queries, etc. The exploitation model adjusts the benign query with one or more constructs that may lead to the disclosure of protected data. For example, the exploitation model may replace a benign data identifier with a protected data identifier to generate an exploitation query. The injection prevention model is applied to the exploitation query to determine if protected data identified with the protected data identifier is returned in a result for the exploitation query. If the result includes the protected data, then the injection prevention model did not deny the exploitation query and the exploitation query may be stored as an exfiltration query. The system may continuously perform the exploration and exploitation stages and generate multiple exfiltration queries.

The exfiltration queries evade the defenses provided by the injection prevention model to exfiltrate data. The exfiltration queries may then be used to identify and fix the issues in the injection prevention model. For example, the query modeling used by the injection prevention model may be updated before deploying the injection prevention model to production.

As disclosed, the defenses of injection prevention models at runtime are tested against data exfiltration attacks. The test generation technique automatically generates data exfiltration attacks (exfiltration queries) by following the notion of mimicry to evade detection and perform unwarranted information disclosure of databases.

Unwarranted information disclosure is disclosure of information from a database, which is not supposed to be disclosed. For example, disclosing data in a column that was not disclosed in the training queries used to train the injection prevention model. The columns and data that were not disclosed in the training queries are referred to as protected columns and protected data.

There are multiple levels of unwarranted information disclosure, including the disclosure of data from protected columns and the disclosure of the existence of protected columns. Each type of unwarranted information disclosure may be a security criterion for which to test the defenses provided by the injection prevention model. In an embodiment, methods of the disclosure may test the defenses for the disclosure of data from protected columns. The exploration stage explores the search space of possible queries to find new benign queries and the exploitation stage modifies the semantics (e.g., modifies a column name) of the benign queries to create potential data exfiltration attacks, i.e., an exfiltration query. As disclosed, mimicry-based attack generation to evade detection by injection prevention models can be used to test the defenses for multiple security criteria, including tables, columns, rows, cells, names thereof, etc.

Turning to FIG. 1, the system (100) is a computing system shown in accordance with one or more embodiments. The system (100) and corresponding components may utilize the computing systems described in FIG. 6A and FIG. 6B to perform mimicry-based attack generation. The user devices A (180) and B (185) through N (190) may communicate with the server (150) to access the application (152), which accesses the database (170). Access to the database (170) is gated by the injection prevention model (155), which is tested with the exfiltration model (162), as further described below. The system (100) includes the server (150), the user devices A (180) and B (185) through N (190), the database (170), and the repository (102).

The repository (102) is a type of storage unit and/or device (e.g., a file system, database, data structure, or any other storage mechanism) for storing the data used by the system (100). The repository (102) may include multiple different, potentially heterogenous, storage units and/or devices. The repository (102) stores data utilized by other components of the system (100). The data stored by the repository (102) may include the requests (105), the queries (108), the data identifiers (110), the results (112), the responses (115), the training queries (125), the benign queries (128), the exploration queries (130), the protected data identifiers (132), the exploitation queries (135), and the exfiltration queries (138).

The requests (105) are collections of data passed between the components of the system (100). The requests (105) may be passed between the user devices A (180) through N (190), the server (150), the database (170), etc. The user applications A (182) through N (192) may pass requests to the application (152) for data and services provided by the application (152). The application (152) may pass requests to the database (170) to access the data (172). In an embodiment, the requests (105) may be stored as text in files that are passed between the components of the system (100). The requests (105) may include the queries (108).

The queries (108) are collections of data that specify the retrieval of the data (172) from the database (170). In an embodiment, a query, of the queries (108), may be a string of text that identifies data to be retrieved using commands. The text of the query may be written in accordance with a query grammar that specifies the syntax for a query language that defines the commands that may be used to access the data from the database (170). The queries (108) may include the data identifiers (110).

The data identifiers (110) are identifiers for the data (172) within the database (170). In an embodiment, the data identifiers (110) may include the names of columns, rows, cells, etc. within the database (170) that store the data (172). A data identifier of the data identifiers (110) that references the benign data (175) may be referred to as a benign data identifier. A data identifier of the data identifiers (110) that references the protected data (178) may be referred to as a protected data identifier, which may be within the protected data identifiers (132).

The results (112) are collections of data that are returned responsive to the queries (108). A result of the results (112) may include a portion of the data (172) from the database (170) that is responsive to a query of the queries (108). The results (112) may include a portion of the data (172) from the database (170), which may include the benign data (175), the protected data (178), combinations thereof, etc. The results (112) may be included in the responses (115).

The responses (115) are collections of data that are returned in response to the requests (105). One of the responses (115) from the database (170) may include one of the results (112) and be transmitted to the server (150) and received by the application (152). One of the responses (115) from the application (152) to one of the user applications A (182) through N (192) may include data from one of the results (112).

The training queries (125) are collections of data that include queries used to train the injection prevention model (155). The training queries (125) may be a subset of the queries (108) that were generated by the application (152) during training. The training queries (125) may form the basis for the benign queries (128). In an embodiment, the training queries (125) represent queries that should be allowed by the injection prevention model (155), which may be referred to as positive samples.

The benign queries (128) are queries that are benign in that they do not trigger a rejection by the injection prevention model (155). The benign queries (128) may include the training queries (125) and include a portion of the exploration queries (130) that do not trigger a rejection by the injection prevention model (155).

The exploration queries (130) are queries that explore the space of queries that are allowed by the injection prevention model (155). In an embodiment, the exploration queries (130) may be generated from the benign queries (128). An exploration query of the exploration queries (130) may differ from one of the benign queries (128) by having a symbol from the query language added to or removed from the benign query. The symbol is defined by the query language as a command that may be used to retrieve or process the data (172) from the database (170). The exploration queries (130) that do not trigger a rejection from the injection prevention model (155) may be included with the benign queries (128). The exploration queries (130) may include benign data identifiers and may not include the protected data identifiers (132).

The protected data identifiers (132) are identifiers that reference the protected data (178) within the database (170). The protected data identifiers (132) may be identified during the training of the injection prevention model (155) and used to specify the protected data (178) within the data (172) that should not be accessed from the database (170). In an embodiment, the protected data identifiers (132) are not included in the exploration queries (130) and may be included in the exploitation queries (135).

The exploitation queries (135) are queries that include the protected data identifiers (132). In an embodiment, one of the exploitation queries (135) is one of the exploration queries (130) in which a benign data identifier from the exploration query is replaced with one of the protected data identifiers (132). The exploitation queries (135) attempt to exfiltrate the protected data (178) from the database (170) but may or may not be successful based on the training of the injection prevention model (155). The exploration queries (130) and the exploitation queries (135) are used to test the injection prevention model (155). The exfiltration queries (138) are a subset of the exploitation queries (135). An exfiltration query of the exfiltration queries (138) is one of the exploitation queries (135) that is successful in exfiltrating at least a portion of the protected data (178). Successful creation of the exfiltration queries (138) may indicate that the injection prevention model (155) is to be updated to prevent exfiltration of the protected data (178) from the database (170).

The exfiltration queries (138) are queries that may exfiltrate data from the database (170). The exfiltration queries (138) may be a subset of the exploitation queries (135) that were successful in accessing the protected data (178) during the testing of the exploitation model (168).

Continuing with FIG. 1, the system (100) includes the server (150). The server (150) is one or more computing systems, which may be in a cloud environment, with processors and memory to execute programs. An example of the server (150) may be the computing system (600) shown in FIG. 6A. The server (150) includes components to operate the application (152), the injection prevention model (155), the training application (158), the testing application (160), and the exfiltration model (162).

The application (152) is a collection of programs that may operate on the server (150) that sends requests to the database (170) to access the data (172). The requests sent by the application (152) may be sent in response to requests received by the application (152) from the user devices A (180) through N (190). The application (152) receives responses from the database (170) that may include a portion of the data (172) and then sends responses back to the user devices A (180) through N (190). The requests sent between the application (152) and the database (170) may be monitored or intercepted by the injection prevention model (155). If the request from the application (152) to the database (170) does not get rejected by the injection prevention model (155), then the response from the database (170) may include a portion of the data (172). The portion of the data (172) may then be returned in a response to the user devices A (180) through N (190).

The injection prevention model (155) is a collection of programs operating on the server (150). The injection prevention model (155) processes requests to the database (170) to determine whether a request is a malicious request that attempts to access the protected data (178) instead of the benign data (175). During training, the injection prevention model (155) observes the messaging between the application (152) and the database (170). The messaging includes requests with the training queries (125) that access the benign data (175). In an embodiment, the injection prevention model (155) may use one or more of a syntax-based algorithm and a feature-based algorithm to process the training queries (125) to learn the expected behavior between the application (152) and the database (170). After training, the injection prevention model (155) is tested during runtime with the exfiltration model (162) to determine if the injection prevention model (155) is sufficient to prevent exfiltration of the protected data (178).

The training application (158) is a collection of programs operating on the server (150). In an embodiment, the training application (158) controls the application (152) and the injection prevention model (155) to train the injection prevention model (155) on the access patterns of the application (152) to the database (170). The training application (158) may set up the injection prevention model (155) to observe the messages passed between the application (152) and the database (170) to train the injection prevention model (155).

The testing application (160) is a collection of programs operating on the server (150). In an embodiment, the testing application (160) controls the application (152) and the injection prevention model (155) so that the injection prevention model (155) may intercept the requests of the application (152) to the database (170). After intercepting a request from the application (152), the injection prevention model (155) determines if a query in the request may attempt to access the protected data (178). The injection prevention model (155) may reject a request that may attempt to access the protected data (178) so that a response to the request from the application (152) may be an empty or null result, which the application (152) may return to the user applications A (182) through N (192). The testing application (160) uses the exfiltration model (162) to test the injection prevention model (155) with the exploration queries (130) and the exploitation queries (135) to determine if the injection prevention model (155) is sufficient to prevent exfiltration of the protected data (178). In an embodiment, the injection prevention model (155) may be sufficient when the injection prevention model (155) rejects the exploitation queries (135) to prevent the generation of the exfiltration queries (138). If the injection prevention model (155) does not prevent access to the protected data (178) as evidenced by the creation of the exfiltration queries (138), then the injection prevention model (155) may undergo additional training, which may use the exfiltration queries (138) as negative samples.

The exfiltration model (162) is a collection of programs operating on the server (150). The exfiltration model (162) tests the injection prevention model (155) with the exploration queries (130) and the exploitation queries (135) using the exploration model (165) and the exploitation model (168).

The exploration model (165) is a collection of programs that may operate within the exfiltration model (162). The exploration model (165) generates the exploration queries (130) from the benign queries (128). In an embodiment, the exploration model (165) identifies symbols that may be added to or removed from the benign queries (128) to generate the exploration queries (130). The exfiltration model (162) may pass the exploration queries (130) to the injection prevention model (155) and may add the exploration queries (130) that do not get rejected by the injection prevention model (155) to the benign queries (128).

The exploitation model (168) is a collection of programs that may operate under the exfiltration model (162). The exploitation model (168) generates the exploitation queries (135) from the benign queries (128) and the protected data identifiers (132). The exploitation model (168) may generate the exploitation queries (135) by replacing benign data identifiers within the benign queries (128) with the protected data identifiers (132). The exfiltration model (162) may pass the exploitation queries (135) to the injection prevention model (155) and the exploitation queries (135) that do not get rejected by the injection prevention model (155) may be saved as the exfiltration queries (138).

The database (170) is a collection of components, hardware and software, that store and manage access to the data (172). The database (170) may receive requests for access to the data (172) and generate responses that may include results which may include the benign data (175) or the protected data (178).

The data (172) is the data stored by the database (170). The data (172) includes the benign data (175) and the protected data (178). The data (172) may include values for cells within rows and columns of tables stored within the database (170). The data (172) may use other types of data structures to store the data.

The benign data (175) is data within the database (170). The benign data (175) is data that may be accessed by the application (152).

The protected data (178) is data within the database (170). The protected data (178) is data that should not be accessed by the application (152). An attempt to access the protected data (178) may be from exploitation queries (135) that the injection prevention model (155) is intended to reject.

Although described within the context of a client server environment with servers and user devices, aspects of the disclosure may be practiced with a single computing system and application. For example, a monolithic application may operate on a computing system to perform the same functions as one or more of the applications executed by the server (150) and the user devices A (180) and B (185) through N (190).

Continuing with FIG. 1, the user devices A (180) and B (185) through N (190) may interact with the server (150). The user devices A (180) and B (185) through N (190) may be computing systems in accordance with FIG. 6A and FIG. 6B. The user devices A (180) and B (185) through N (190) may include and execute the user applications A (182) and B (188) through N (192).

The user applications A (182) and B (188) through N (192) are programs that operate on the user devices A (180) and B (185) through N (190) to provide user interaction by collecting user inputs and displaying outputs in response to the user inputs. The user applications A (182) and B (188) through N (192) may include user interfaces with user interface elements to receive inputs and display outputs to users of the system (100).

In an embodiment, the user device A (180) is operated by a user to test the injection prevention model (155) with the exfiltration model (162) after the injection prevention model (155) is trained. The user device A (180) may provide selections to identify the application (152), the injection prevention model (155), and the data (172) within the database (170). Responsive to the selections, the testing application (160) may operate the application injection prevention model (155) using the exfiltration model (162) to generate the exfiltration queries (138) and determine if the injection prevention model (155) leaves the application (152) vulnerable to data exfiltration. The determination and the exfiltration queries may be received by the user device A (180) and displayed to the user. If the determination indicates that the application (152) is vulnerable, then deployment of the application (152) may be prevented.

In an embodiment, the user device N (190) may be operated by an end user to access the application (152) after deployment. After deployment, access by the application (152) to the database (170) is gated by the injection prevention model (155) after being tested with the exfiltration model (162). The application (152) may retrieve the benign data (175) from the database (170) that is returned to and displayed by the user device N (190).

Although described within the context of a client server environment with servers and user devices, aspects of the disclosure may be practiced with a single computing system and application. For example, a monolithic application may operate on a computing system to perform the same functions as one or more of the applications executed by the server (150) and the user devices A (180) and B (185) through N (190).

Figure 2:
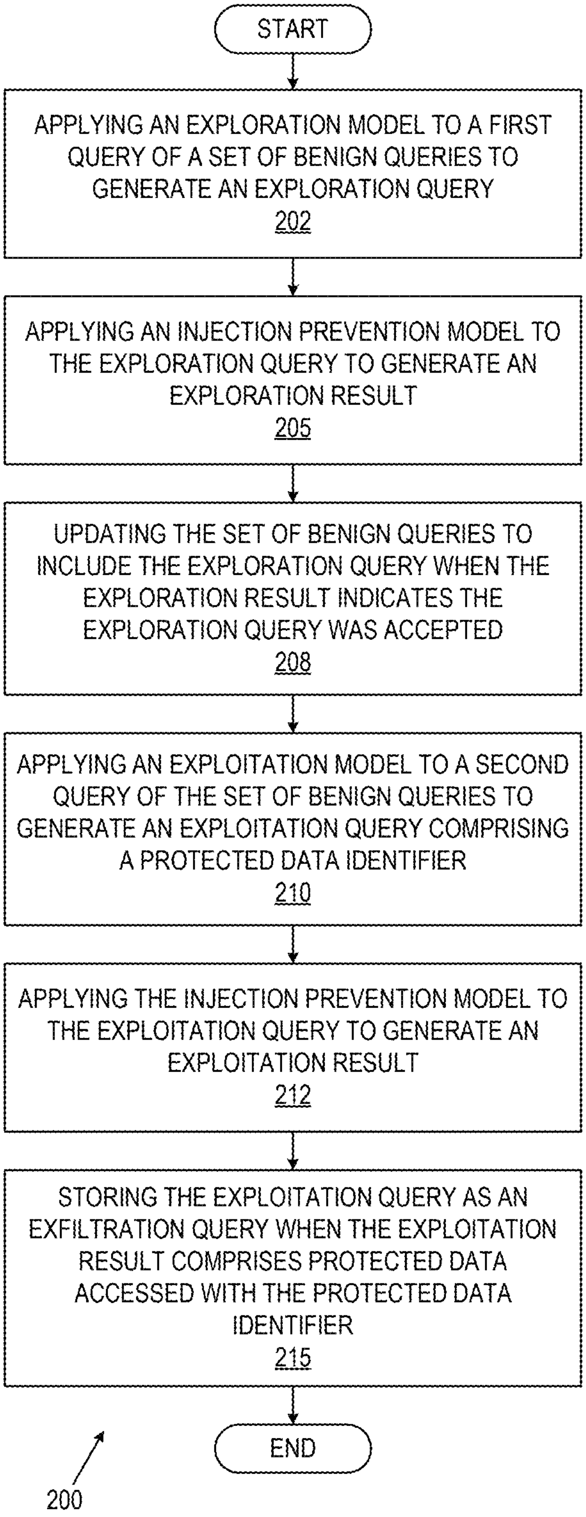
FIG. 2 shows a flowchart in accordance with one or more embodiments of the disclosure.

FIG. 2 shows a flowchart of a method for mimicry-based attack generation used to test and train injection prevention models, in accordance with one or more embodiments. The method of FIG. 2 may be implemented using the system of FIG. 1, and one or more of the steps may be performed on, or received at, one or more computer processors. In an embodiment, a system may include at least one processor and an application that, when executing on the at least one processor, performs the method. In an embodiment, a non-transitory computer readable medium may include instructions that, when executed by one or more processors, perform the method. The outputs from various components (including models, functions, procedures, programs, processors, etc.) from performing the method may be generated by applying a transformation to inputs using the components to create the outputs without using mental processes or human activities.

Turning to FIG. 2, the process (200) may be part of the application of an exfiltration model to training queries to generate an exfiltration query. The process (200) may include multiple steps (e.g., steps 202 through 215) that may execute on the components described in the other figures, including those of FIG. 1.

Step 202 includes applying an exploration model to a first query of a set of benign queries to generate an exploration query. Application of the exploration model may include identifying symbols, selecting the symbol, and updating the query with the symbol.

Identifying a symbol includes identifying a set of symbols from a query grammar. Each symbol of the set of symbols may be a symbol that may be added to or removed from the first query without violating the query grammar. The exploration model may compare the symbols from the first query to the symbols defined by the query grammar to identify a set of symbols from the query grammar that may be added to the first query. The exploration model may further analyze the first query to identify symbols within the first query that may be removed without violating the rules from the query grammar. The addition or removal of a symbol to the first query is in accordance with the query grammar and it does not violate the rules within the query grammar for the order or sequence of symbols that may be used in a query.

Generating the exploration query further includes selecting a symbol from the set of symbols. In an embodiment, the symbol that is selected may be selected randomly from the set of symbols that may be added to or removed from the first query.

Generating the exploration query further includes updating the first query with the symbol to form the exploration query. In an embodiment, the first query may be updated by adding or removing the symbol from the first query.

Step 205 includes applying an injection prevention model to the exploration query to generate an exploration result. In an embodiment, the exploration query may be processed using one or more of a syntax-based algorithm and a feature-based algorithm. For a syntax-based algorithm, application of the injection prevention model may compare symbols from the exploration query to symbols from the training queries to determine if the exploration query should be rejected. A parse tree may be used to perform the comparison with the syntax-based algorithm. For a feature-based algorithm, the data identifier in the exploration query may be compared to the data identifiers from training queries to determine if the exploration query should be rejected.

Step 208 includes updating the set of benign queries to include the exploration query when the exploration result indicates the exploration query was accepted. In an embodiment, the exploration result may include values from the benign data within the database. When the exploration result includes values and not a null result, then the exploration query may be identified as accepted and not rejected. If the exploration result is empty or includes a null result, then the exploration query may be identified as rejected. When the exploration result is accepted, then the exploration query is benign, as in it accesses benign data without accessing protected data, and is added to the set of benign queries, which includes training queries and other exploration queries that were not rejected.

Step 210 includes applying an exploitation model to a second query of the set of benign queries to generate an exploitation query comprising a protected data identifier. Application of the exploitation model to the second query may include selecting a protected data identifier and updating the second query.

Generating the exploitation query includes selecting a benign data identifier in the second query. In an embodiment, the benign data identifier may be randomly selected from one of a set of benign data identifiers that are present in the second query.

Generating the exploitation query further includes selecting a protected data identifier to replace a benign data identifier in the second query. The protected data identifier may be randomly selected from a set of protected data identifiers, which may have been generated during training of the injection prevention model.

Generating the exploitation query further includes updating the second query with the protected data identifier to form the exploitation query. In an embodiment, updating the second query may include replacing the benign data identifier with the protected data identifier to form the exploitation query.

Step 212 includes applying the injection prevention model to the exploitation query to generate an exploitation result. In an embodiment, applying the injection prevention model to the exploitation query includes processing the exploitation query using one or more of a syntax-based algorithm and the feature-based algorithm. In an embodiment, the syntax-based algorithm and the feature-based algorithm may each include instructions that, when executed, compare either syntax or features from the exploitation query with corresponding syntax or features from training queries to determine whether to reject the exploitation query. In an embodiment, one of the syntax-based or feature-based algorithms may be used against the exploitation query (where the syntax may have changed) and the other algorithm (e.g., the feature-based algorithm) may be used against the exploitation query (to identify where a data identifier has changed).

Step 215 includes storing the exploitation query as an exfiltration query when the exploitation result includes protected data accessed with the protected data identifier. In an embodiment, the exploitation result includes protected data instead of an empty or null result when the injection projection model did not reject the exploitation query. In being able to access the protected data, the exploitation query may be stored as one of the queries that can exfiltrate data, i.e., as an exfiltration query in the list of exfiltration queries.

In an embodiment, the method further includes updating a set of exfiltration queries to include the exfiltration query when the exploitation result includes the protected data. Each of the queries in the set of exfiltration queries may have successfully exfiltrated protected data from the database and were not rejected by the injection prevention model. The set of exfiltration queries may be generated by continuously iterating the process (200). A testing application running the process (200) may run continuously for a defined length of time and then reset and run again. For example, a testing application may be executed for a certain number of runs (e.g., ten runs) with each run lasting for a defined length of time (sixty minutes per run). Different numbers of runs and different lengths of time may be used. Each time a run is reset, the set of benign queries may be reset back to the original set of training queries. The benign queries, exploration queries, exploitation queries, and any exfiltration queries may then build back up from the original queries for each run. The list of exfiltration queries may not be re-initialized and exfiltration queries from a subsequent run may be checked for being duplicative of an existing exfiltration query in the list of exfiltration queries. Resetting the benign queries may help in identifying exfiltration queries that are closer to the original queries instead of making additional changes to exploration queries or exploitation queries.

In an embodiment, the method further includes applying a selection model to the set of benign queries to select a benign query as one or more of the first query and the second query. In an embodiment, the benign query is randomly selected from the set of benign queries.

In an embodiment, the method further includes training the injection prevention model with the set of benign queries as positive samples. In an embodiment, the training queries may be updated with additional benign queries that were identified during the exploration stage of testing the injection prevention model. The original training queries and the benign queries are identified as positive samples, which are queries that access benign data without accessing protected data.

In an embodiment, the method further includes preventing deployment of the injection prevention model responsive to the exfiltration query. In an embodiment, when an exfiltration query is successfully created and identified as a query that accesses protected data, the system may identify the injection prevention model as being insufficient for protecting the database and prevent the deployment of the injection prevention model.

In an embodiment, the method further includes retraining the injection prevention model with a set of exfiltration queries, including the exfiltration query, as negative samples. In an embodiment, each of the exfiltration queries were able to access protected data and are identified as negative samples. The negative samples are used by a training application to train the injection prevention model with examples of queries that should not be accepted by the injection prevention model.

In an embodiment, the method further includes deploying the injection prevention model after retraining the injection prevention model with the exfiltration query. In an embodiment, the injection prevention model, after retraining, is able to reject queries from the set of exfiltration queries that the injection prevention model was previously unable to reject. By being able to reject the exfiltration queries, the injection prevention model may be identified as being safe for deployment, and then deployed. Deployment of the injection prevention model may include instantiating the injection prevention model of a server and setting up the injection prevention model to intercept queries from applications attempting to access the database.

Figure 3:
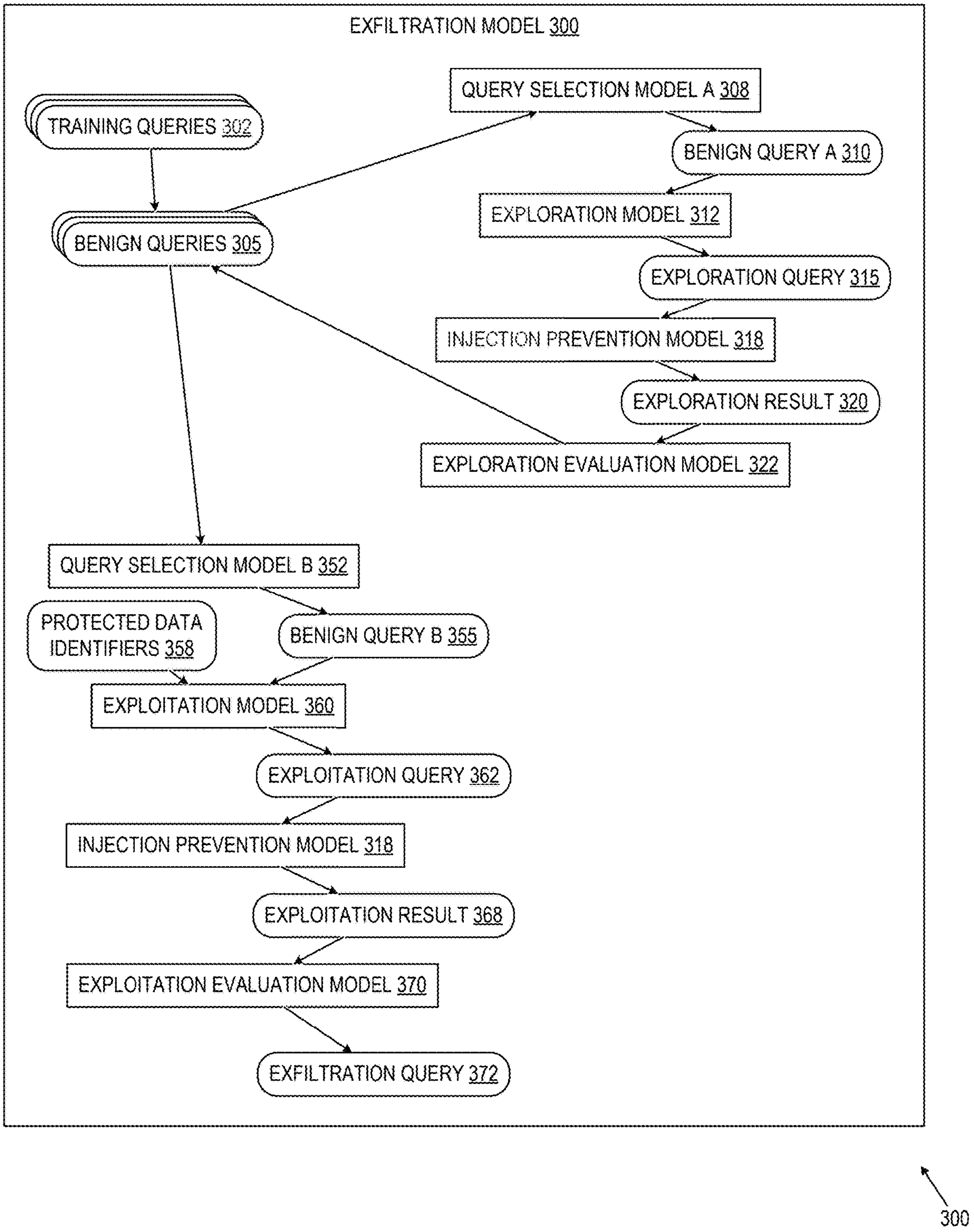
FIG. 3, FIG. 4A, FIG. 4B, FIG. 4C, FIG. 5A, and FIG. 5B show examples in accordance with one or more embodiments of the disclosure.

Turning to FIG. 3, the exfiltration model (300) processes the training queries (302) to generate the exfiltration query (372) to test the injection prevention model (318). The exfiltration model (300) may execute on a server, such as the server of FIG. 1.

The training queries (302) are queries used to train the injection prevention model (318). The training queries (302) may be positive samples that are benign and do not access protected data. In an embodiment, the training queries (302) may be filtered to include positive samples without negative samples.

The benign queries (305) are queries that may access benign data without accessing protected data. The benign queries (305) may include the training queries (302) along with exploration queries (e.g., the exploration query (315)) that are generated by the exfiltration model (300) during the testing of the injection prevention model (318). The benign queries (305) may be input to the query selection model A (308).

The query selection model A (308) receives the benign queries (305). The query selection model A (308) selects one of the benign queries (305) as the benign query A (310). In an embodiment, the query selection model A (308) may use random selection to select the benign query A (310).

The benign query A (310) is a query selected by the query selection model A (308) from the benign queries (305). The benign query A (310) is an input to the exploration model (312).

The exploration model (312) is a program running under the exfiltration model (300). The exploration model (312) receives the benign query A (310), which is processed to generate the exploration query (315). In an embodiment, the exploration model (312) uses a query grammar to identify symbols that may be added to the benign query A (310) and to identify symbols within the benign query A (310) that are optional and may be removed. The exploration model (312) may randomly select one of the symbols to add to or remove from the benign query A (310) to generate the exploration query (315).

The exploration query (315) is an output from the exploration model (312). The exploration query (315) is input to the injection prevention model (318) as a test of the injection prevention model (318) by the exfiltration model (300).

The injection prevention model (318) receives the exploration query (315), which is processed to generate the exploration result (320). The injection prevention model may use a syntax-based algorithm, a feature-based algorithm, both syntax-based and feature-based algorithms, etc., to process the exploration query (315) and generate the exploration result (320).

The exploration result (320) is an output from the injection prevention model (318) for the exploration query (315). The exploration result (320) is input to the exploration evaluation model (322). The exploration result (320) may be empty or a null result when the exploration query (315) is rejected by the injection prevention model (318). The exploration results (320) may include values from a database when the injection prevention model (318) allows the exploration query (315) to proceed to a database.

The exploration evaluation model (322) receives and processes the exploration result (320). In an embodiment, the exploration evaluation model (322) may store the exploration query (315) to the benign queries (305) when the exploration result (320) includes results from the database and was not rejected by the injection prevention model (318).

The query selection model B (352) selects one of the benign queries (305) as the benign query B (355). In an embodiment, the query selection model B (352) may be the same as the query selection model A (308) and select the benign query B (355) using random selection from the benign queries (305).

The benign query B (355) is a query selected by the query selection model B (352) from the benign queries (305). The benign query B (355) may be one of the training queries (302) and may be the exploration query (315).

The protected data identifiers (358) are an input to the exploitation model (360). The protected data identifiers (358) identify protected data within a database that is not to be accessed by a query.

The exploitation model (360) receives and processes the benign query B (355) and the protected data identifiers (358) to generate the exploitation query (362). The exploitation model (360) may randomly select one of the data identifiers from the benign query B (355) to be replaced with a protected data identifier from the protected data identifiers (358). In an embodiment, the exploitation model (360) may select one of the protected data identifiers (358) that is from the same superset as the benign data identifiers selected from the benign query B (355). For example, the benign data identifier may reference a column from a table and the protected data identifier may reference a different column from the same table.

The exploitation query (362) is an output from the exploitation model (360). The exploitation query (362) is input to the injection prevention model (318) by the exfiltration model (300) to test the injection prevention model (318). The exploitation query (362) includes one of the protected data identifiers (358).

The injection prevention model (318) is used again to process the exploitation query (362) to generate the exploitation result (368). When the injection prevention model (318) determines that the exploitation query (362) is malicious (i.e., for attempting to access protected data within the database) then the injection prevention model (318) may reject the exploitation query (362) and include a null or empty set within the exploitation result (368). When the injection prevention model (318) determines, erroneously, that the exploitation query (362) is not malicious, then the injection prevention model (318) may allow the exploitation query (362) to be processed by the database and return values from the protected data within the database, which may be within the exploitation result (368).

The exploitation result (368) is an output from the injection prevention model (318). The exploitation result (368) is generated for the exploitation query (362).

The exploitation result (368) may include a null set or empty set of data when the exploitation query (362) is rejected by the injection prevention model (318). The exploitation result (368) may include values from the protected data within the database when the exploitation query (362) is not rejected by the injection prevention model (318).

The exploitation evaluation model (370) processes the exploitation result (368) to generate the exfiltration query (372). The exfiltration query (372) may be generated from the exploitation query (362) when the exploitation evaluation model (370) determines that the exploitation result (368) includes values from the protected data from the database. When the exploitation result (368) includes a null value or empty set, which indicates that the injection prevention model (318) rejected the exploitation query (362), then the exploitation evaluation model (370) may not generate the exfiltration query (372).

The exfiltration query (372) is an output from the exploitation evaluation model (370). The exfiltration query (372) may be a copy of the exploitation query (362) when the exploitation query (362) is not rejected by the injection prevention model (318).

Figure 4A:
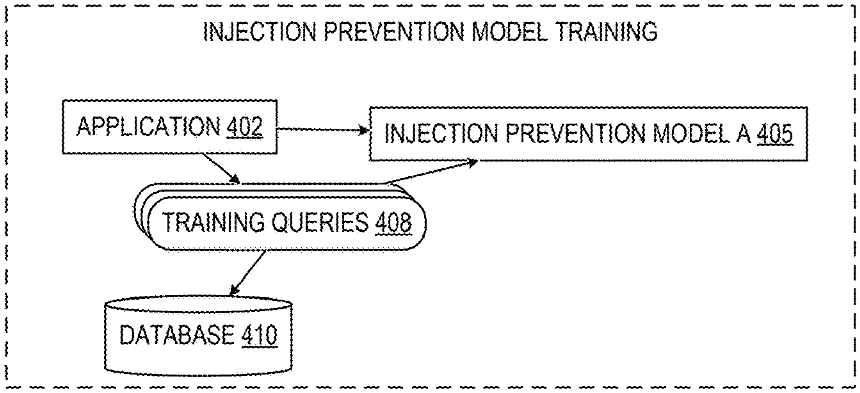
Figure 4B:
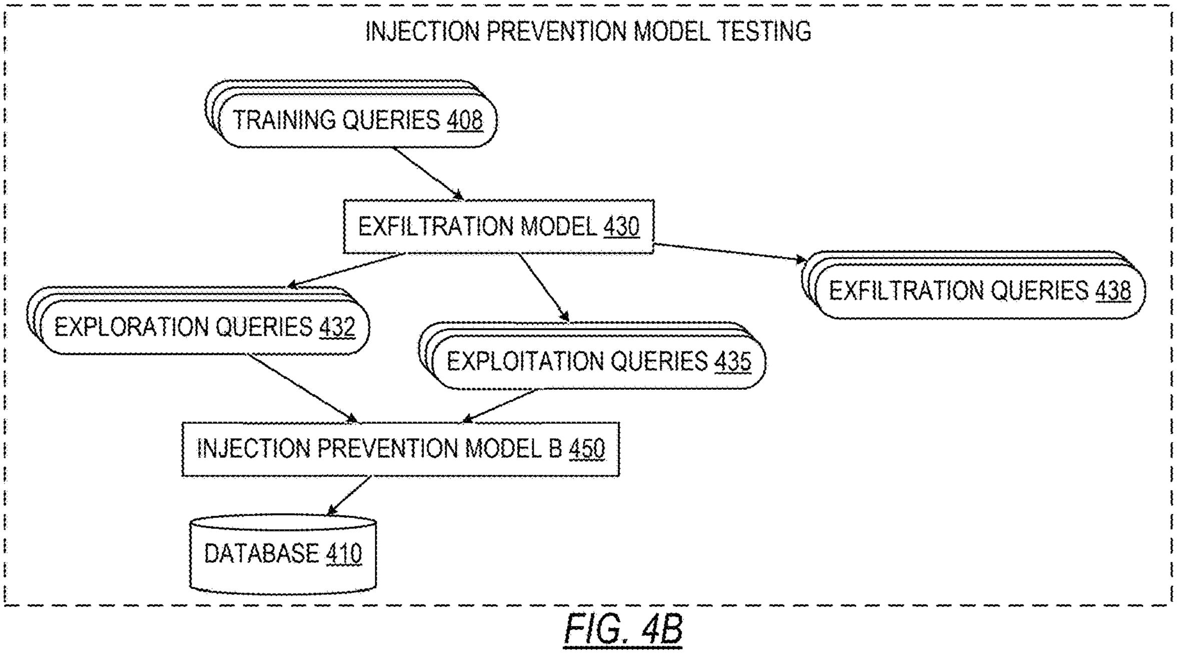
Figure 4C:
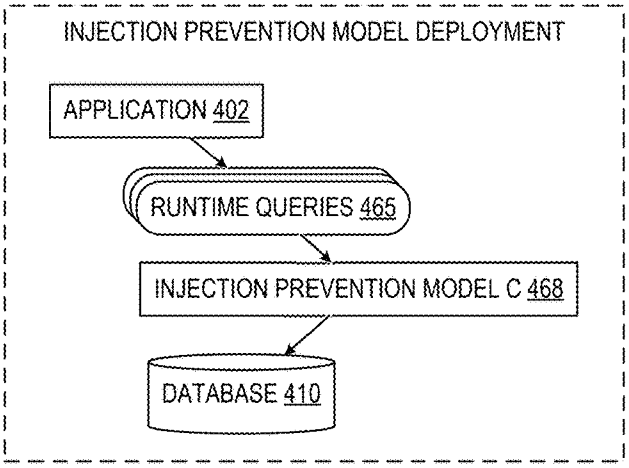

FIG. 4A, FIG. 4B, and FIG. 4C are data flow diagrams depicting the injection prevention model during different phases. FIG. 4A shows the injection prevention model (405) during training. FIG. 4B shows the injection prevention model B (450) during testing. FIG. 4C shows the injection prevention model C (468) after deployment of the injection prevention model C (468).

Turning to FIG. 4A, the application (402) is operated by the system to access the database (410) using the training queries (408). The injection prevention model A (405) may observe the application (402) and the training queries (408) to identify queries that may be used to access the database (410) and identify data that may be accessed from the database (410). The observation may be implemented by the injection prevention model A (405) intercepting messages generated by the application (402), which may include the training queries (408). The injection prevention model A (405) may use one or more of syntax-based algorithms or feature-based algorithms to observe the benign syntax or features used by the application (402) and the training queries (408).

Turning to FIG. 4B, the system processes the training queries (408) using the exfiltration model (430). Upon application of the exfiltration model (430) to the training queries (408), the exfiltration model (430) generates one or more of the exploration queries (432), the exploitation queries (435), and the exfiltration queries (438) from the training queries (408). The exploration queries (432) are based on the training queries (408) but may differ by including or removing symbols from the training queries (408). The exploitation queries (435) may be versions of the training queries (408) and the exploration queries (432) that replace benign data identifiers with protected data identifiers to attempt to access protected data in the database (410). The exfiltration queries (438) are exploitation queries (435) that were successful in exfiltrating protected data from the database (410). The exploration queries (432) and the exploitation queries (435) are input to the injection prevention model B (450).

During testing, the injection prevention model B (450) is applied to the exploration queries (432) and the exploitation queries (435) to determine if the queries are to be rejected. When the queries are not rejected by the injection prevention model B (450) then the queries may access the data within the database (410). The injection prevention model B (450) is updated from the injection prevention model A (405) in that the injection prevention model B (450) has been trained on the training queries (408).

If the injection prevention model B (450) rejects each of the exploitation queries (435), then the injection prevention model B (450) may be ready for deployment. If the injection prevention model B (450) does not reject each of the exploitation queries (435), then the queries that were not rejected may be saved as the exfiltration queries (438), and the injection prevention model B (450) may undergo additional training using the exfiltration queries (438).

Turning to FIG. 4C, the injection prevention model C (468) has been deployed with the application (402). The injection prevention model C (468) intercepts the runtime queries (465) provided by the application (402) to access the database (410). The injection prevention model C (468) is updated from the injection prevention model B (450) of FIG. 4B in that the injection prevention model C (468) has been deployed to process the runtime queries (465). The injection prevention model C (468) protects the protected data within the database (410) from malicious queries that may slip into the runtime queries (465).

Figure 5A:
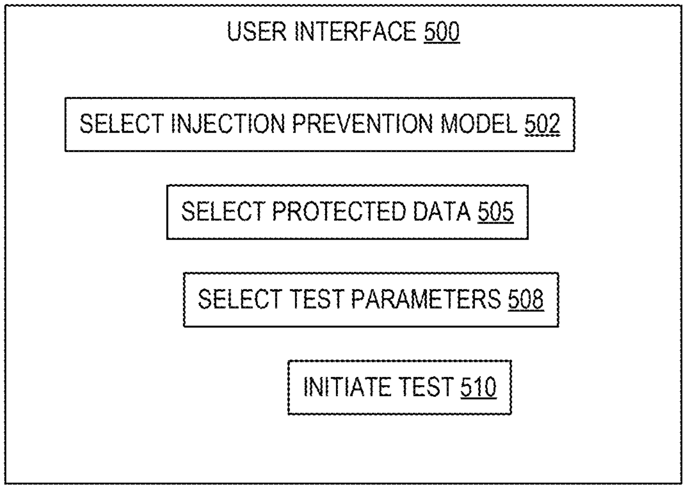
Figure 5B:
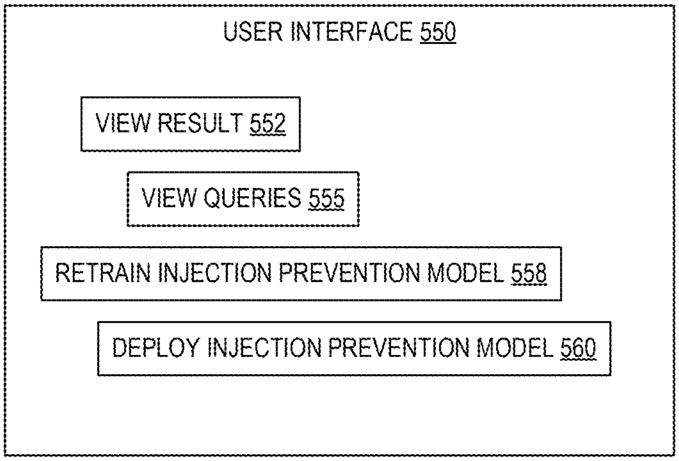

FIG. 5A and FIG. 5B depict the user interfaces (500) and (550). The user interfaces (500) and (550) may be used to generate exfiltration queries during the testing of injection prevention models.

Turning to FIG. 5A, the user interface (500) includes multiple interface elements. The interface elements may be manipulated by a user operating a user device.

The interface element (502) includes the text "select injection prevention model". Selection of the interface element (502) may bring up a menu which the user may use to select an injection prevention model to test.

The interface element (505) is a button with the text "select protected data". Selection of the interface element (505) may bring up a menu that may be used to identify protected data within a database that should be inaccessible to queries that may be used to test the injection prevention model selected with the interface element (502).

The interface element (508) includes the text "select test parameters". Selection of the interface element (508) may bring up a menu to use to select parameters for the test. Parameters may include the number of runs to perform and include the duration of each run. For example, a user may select to include ten runs with 60 minutes for each run.

The interface element (510) is a button within the user interface (500). The interface element (510) is a button that includes the text "initiate test". Selection of the button (510) may initiate testing of the injection prevention model selected with the interface element (502) with the test parameters selected with the interface element (508) to determine if the selected injection prevention model allows access to the protected data that was identified using the interface element (505).

Turning to FIG. 5B, the user interface (550) is updated from the user interface (500) of FIG. 5A, after the injection prevention model is tested. The user interface (550) includes multiple interface elements. The interface element (552) is a button with the text "view result". Selection of the interface element (552) may bring up a window that shows the results of testing the injection prevention model selected with the user interface (500) of FIG. 5A. The results may identify whether or not protected data was retrieved from the database during testing.

The interface element (555) is a button that includes the text "view queries". Selection of the interface element (555) may bring up a menu to view the queries used to test the injection prevention model. The queries that are displayed may include the test queries, benign queries, exploration queries, exploitation queries, and exfiltration queries.

The interface element (558) is a button that includes the text "retrain injection prevention model". Selection of the interface element (558) may bring up a menu that may be used to initiate additional training for the injection prevention model selected with the user interface (500) of FIG. 5A. The retraining may include the exfiltration queries that may have been displayed using the view queries button (555).

The interface element (560) is a button that includes the text "deploy injection prevention model". Selection of the button (560) may bring up a menu that may be used to deploy the injection prevention model that was tested. In an embodiment, the interface element (560) may not be selectable when the result of the test was not satisfactory, in other words, when the injection prevention model allowed exfiltration of protected data from the database. In an embodiment, the deployment of the injection prevention model may be executed automatically upon receipt of a result indicating that the injection prevention model rejected malicious queries, which may be indicated by the lack of exfiltration queries generated during testing.

Figure 6A:
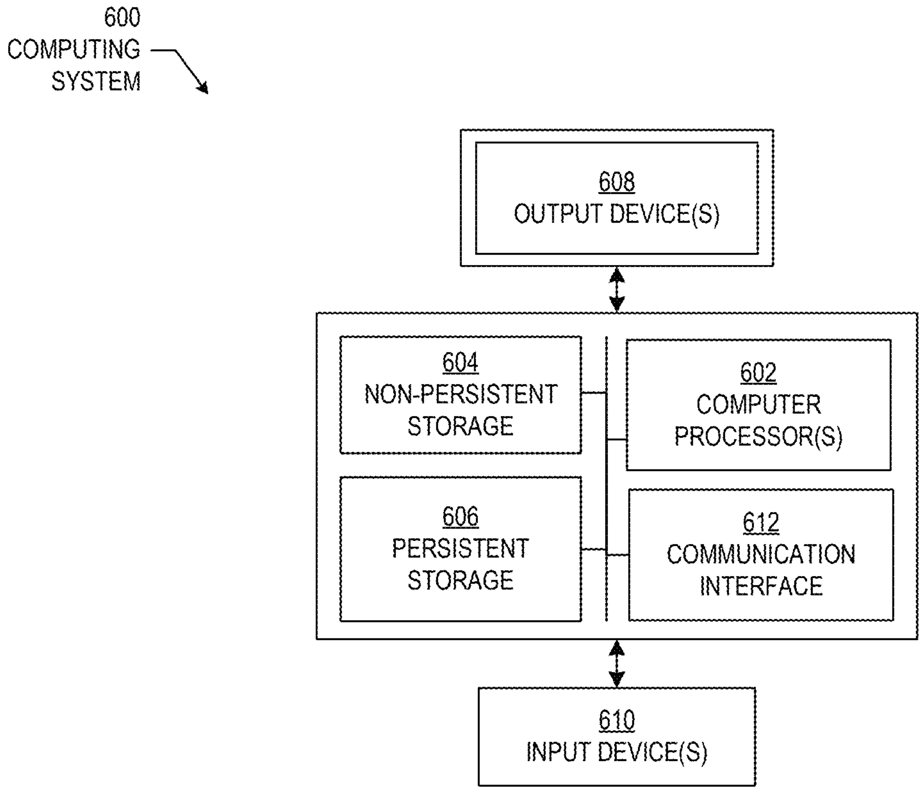
FIG. 6A and FIG. 6B show computing systems in accordance with one or more embodiments.
Figure 6B:
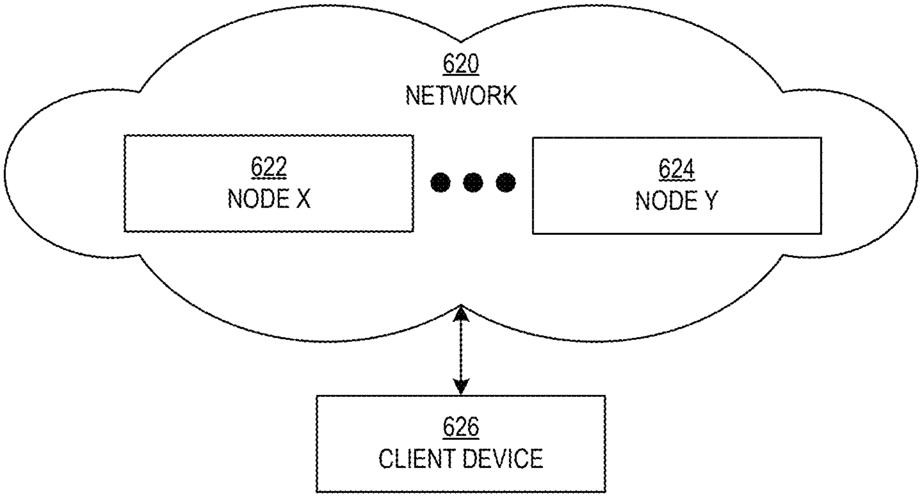

Embodiments may be implemented on a special purpose computing system specifically designed to achieve the improved technological result. Turning to FIG. 6A and FIG. 6B, the special purpose computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor (s) (602) includes one or more processors. The one or more processors may include a central processing unit (CPU), a graphics processing unit (GPU), a tensor processing unit (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (608). The inputs may include text input, audio input, video input, etc., which may be processed and transmitted by the computing system (600) in accordance with the disclosure. The communication interface (612) may include an integrated circuit for connecting the computing system (600) to a network (not shown) (e.g., a local area network (LAN), a wide area network (WAN) such as the Internet, mobile network, or any other type of network), and/or to another device, such as another computing device.

Further, the output device(s) (608) may include a display device, a printer, external storage, or any other output device. One or more of the output device(s) (608) may be the same or different from the input device(s) (610). The input (610) and output device(s) (608) may be locally or remotely connected to the computer processor(s) (602). Many different types of computing systems exist, and the aforementioned input (610) and output device(s) (608) may take other forms. The output device(s) (608) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (600) in FIG. 6A may be connected to or be a part of a network. For example, as shown in FIG. 6B, the network (620) may include multiple nodes (e.g., node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the disclosure.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or a semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an "or" may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above may be devised which do not depart from the scope of the claims as disclosed herein. Accordingly, the scope should be limited only by the attached claims.

What is claimed is:

1. A method comprising:

applying an exploration model to a first query of a set of benign queries to generate an exploration query to determine whether the injection prevention model denies processing of the exploration query;

applying an injection prevention model to the exploration query to generate an exploration result;

updating the set of benign queries to include the exploration query when the exploration result indicates the exploration query was accepted;

applying an exploitation model to a second query of the set of benign queries to generate an exploitation query comprising a protected data identifier by substituting the protected data identifier for a benign data identifier in the second query;

applying the injection prevention model to the exploitation query to generate an exploitation result; and storing the exploitation query as an exfiltration query when the exploitation result comprises protected data accessed with the protected data identifier.

2. The method of claim 1, further comprising:

updating a set of exfiltration queries to include the exfiltration query when the exploitation result comprises the protected data.

3. The method of claim 1, further comprising:

applying a selection model to the set of benign queries to select a benign query as one or more of the first query and the second query, wherein the benign query is randomly selected from the set of benign queries.

4. The method of claim 1, wherein applying the injection prevention model to the exploration query comprises processing the exploration query using one or more of a syntax-based algorithm and a feature-based algorithm, and applying the injection prevention model to the exploitation query comprises processing the exploitation query using one or more of the syntax-based algorithm and the feature-based algorithm.

5. The method of claim 1, further comprising:

generating the exploration query by:

identifying a set of symbols from a query grammar, wherein each symbol of the set of symbols may be one of added to or removed from the first query without violating the query grammar, selecting a symbol from the set of symbols, and updating the first query with the symbol to form the exploration query.

6. The method of claim 1, further comprising:

generating the exploitation query by:

selecting a benign data identifier in the second query, selecting the protected data identifier to replace the benign data identifier in the second query, and updating the second query with the protected data identifier to form the exploitation query.

7. The method of claim 1, further comprising:

training the injection prevention model with the set of benign queries as positive samples.

8. The method of claim 1, further comprising:

preventing deployment of the injection prevention model responsive to the exfiltration query.

9. The method of claim 1, further comprising:

retraining the injection prevention model with a set of exfiltration queries, comprising the exfiltration query, as negative samples.

10. The method of claim 1, further comprising:

deploying the injection prevention model after retraining the injection prevention model with the exfiltration query.

11. A system comprising:

at least one processor; and an application that, when executing on the at least one processor, performs:

applying an exploration model to a first query of a set of benign queries to generate an exploration query to determine whether the injection prevention model denies processing of the exploration query, applying an injection prevention model to the exploration query to generate an exploration result, updating the set of benign queries to include the exploration query when the exploration result indicates the exploration query was accepted, applying an exploitation model to a second query of the set of benign queries to generate an exploitation query comprising a protected data identifier by substituting the protected data identifier for a benign data identifier in the second query, applying the injection prevention model to the exploitation query to generate an exploitation result, and storing the exploitation query as an exfiltration query when the exploitation result comprises protected data accessed with the protected data identifier.

12. The system of claim 11, wherein the application further performs:

updating a set of exfiltration queries to include the exfiltration query when the exploitation result comprises the protected data.

13. The system of claim 11, wherein the application further performs:

applying a selection model to the set of benign queries to select a benign query as one or more of the first query and the second query, wherein the benign query is randomly selected from the set of benign queries.

14. The system of claim 11, wherein:

applying the injection prevention model to the exploration query comprises processing the exploration query using one or more of a syntax-based algorithm and a feature-based algorithm, and applying the injection prevention model to the exploitation query comprises processing the exploitation query using one or more of the syntax-based algorithm and the feature-based algorithm.

15. The system of claim 11, wherein the application further performs:

generating the exploration query by:

identifying a set of symbols from a query grammar, wherein each symbol of the set of symbols may be one of added to or removed from the first query without violating the query grammar, selecting a symbol from the set of symbols, and updating the first query with the symbol to form the exploration query.

16. The system of claim 11, wherein the application further performs:

generating the exploitation query by:

selecting a benign data identifier in the second query, selecting the protected data identifier to replace the benign data identifier in the second query, and updating the second query with the protected data identifier to form the exploitation query.

17. The system of claim 11, wherein the application further performs:

training the injection prevention model with the set of benign queries as positive samples.

18. The system of claim 11, wherein the application further performs:

preventing deployment of the injection prevention model responsive to the exfiltration query.

19. The system of claim 11, wherein the application further performs:

retraining the injection prevention model with a set of exfiltration queries, comprising the exfiltration query, as negative samples.

20. A non-transitory computer readable medium comprising instructions executable by at least one processor to perform:

applying an exploration model to a first query of a set of benign queries to generate an exploration query to determine whether the injection prevention model denies processing of the exploration query;

applying an injection prevention model to the exploration query to generate an exploration result;

updating the set of benign queries to include the exploration query when the exploration result indicates the exploration query was accepted;

applying an exploitation model to a second query of the set of benign queries to generate an exploitation query comprising a protected data identifier by substituting the protected data identifier for a benign data identifier in the second query;

applying the injection prevention model to the exploitation query to generate an exploitation result; and storing the exploitation query as an exfiltration query when the exploitation result comprises protected data accessed with the protected data identifier.

* * * * *